United States Patent
Potter et al.

[11] Patent Number: 5,924,093
[45] Date of Patent: Jul. 13, 1999

[54] VIRTUAL PROCESSOR BUFFERED MERGE SORT FOR PARALLEL APPLICATIONS

[75] Inventors: Eric Thomas Potter, Redondo Beach; John Earl Merritt, Torrance, both of Calif.

[73] Assignee: NCR Corporation, Dayton, Ohio

[21] Appl. No.: 08/864,798

[22] Filed: May 29, 1997

[51] Int. Cl.[6] .................................................. G06F 17/30
[52] U.S. Cl. ................ 707/7; 707/1; 707/8; 707/10; 707/100; 707/200; 707/201
[58] Field of Search ............................... 707/8, 10, 201, 707/7, 200, 1

[56] References Cited

U.S. PATENT DOCUMENTS

| | | | |
|---|---|---|---|
| 5,039,980 | 8/1991 | Aggers et al. | 340/506 |
| 5,119,465 | 6/1992 | Jack et al. | 395/500 |
| 5,430,850 | 7/1995 | Papadopoulos et al. | 395/683 |
| 5,634,053 | 5/1997 | Noble et al. | 707/4 |
| 5,754,841 | 5/1998 | Carino, Jr. | 395/682 |

*Primary Examiner*—Thomas G. Black
*Assistant Examiner*—Donald Min
*Attorney, Agent, or Firm*—Gates & Cooper

[57] ABSTRACT

A method, apparatus, and article of manufacture for sorting data on a parallel processing computer system, wherein the system is comprised of one or more nodes, each of the nodes executes one or more threads to generate a subset of the data, and the subset of data comprises one or more records. A local data structure is generated on each of the nodes, wherein the local data structure stores ordered entries associated with the records generated by each of the threads. A global data structure is generated on a coordinator node, wherein the global data structure stores ordered entries associated with the records stored in each of the local data structures generated by each of the nodes. An answer set is generated using sorted records from the global data structure.

18 Claims, 3 Drawing Sheets

VIRTUAL PROCESSOR BUFFERED MERGE SORT FOR PARALLEL APPLICATIONS

BACKGROUND OF THE INVENTION

1. Field of the Invention

This invention relates in general to parallel processor computer systems, and in particular, to the optimization of a merge-sort function in a parallel processor computer system.

2. Description of Related Art

Parallel processor computer systems are frequently comprised of an operating system and arrays of individual computers (i.e., processor nodes), each with their own central processing unit (CPU), memory, and data storage unit. Tasks are executed in parallel by utilizing each processor node.

During the execution of a task, a body of work is divided into multiple threads. A thread is a stream of instructions executed by the computer on behalf of a task. As an analogy, a task such as an orchestra performing a symphony can be decomposed into many threads which would be the individual musicians, each playing their part.

Typically, in a parallel processor computer system, each thread is allocated to a different processor node. Each of these threads is then executed in parallel at their respective separate nodes. For instance, three threads can occupy and execute simultaneously on three different nodes at the same time.

Although parallel processing has merits, there are shortcomings. Conventional processing techniques may result in an inefficient use of the available hardware. Thus, there is a need in the art for modifications to conventional techniques that exploit the hardware available in parallel processor computer systems.

SUMMARY OF THE INVENTION

To overcome the limitations in the prior art described above, and to overcome other limitations that will become apparent upon reading and understanding the present specification, the present invention discloses a method, apparatus, and article of manufacture for sorting data on a parallel processing computer system, wherein the system is comprised of one or more nodes, each of the nodes executes one or more threads to generate a subset of the data, and the subset of data comprises one or more records. A local data structure is generated on each of the nodes, wherein the local data structure stores ordered entries associated with the records generated by each of the threads. A global data structure is generated on a coordinator node, wherein the global data structure stores ordered entries associated with the records stored in each of the local data structures generated by each of the nodes. An answer set is generated using sorted records from the global data structure.

An object of the present invention is to provide more efficient usage of parallel processor computer systems. This object is achieved through use of the virtual processor (vproc) concept of the present invention, which adds a level of abstraction between the multi-threading of a particular task and the physical layout of the computing system. This feature provides the benefit of better control over the degree of parallelism. Another benefit is higher system availability without undue programming overhead in the application. Still another benefit of the present invention is its ability to provide enhanced fault tolerance.

BRIEF DESCRIPTION OF THE DRAWINGS

Referring now to the drawings in which like reference numbers represent corresponding parts throughout:

FIGS. 2A and 2B are flowcharts illustrating the logic of the present invention, wherein FIG. 2A illustrates the steps of a coordinator node 12 and FIG. 2B illustrates the steps of all nodes 12 executing vprocs 16 according to the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

ENVIRONMENT

Figure 1:
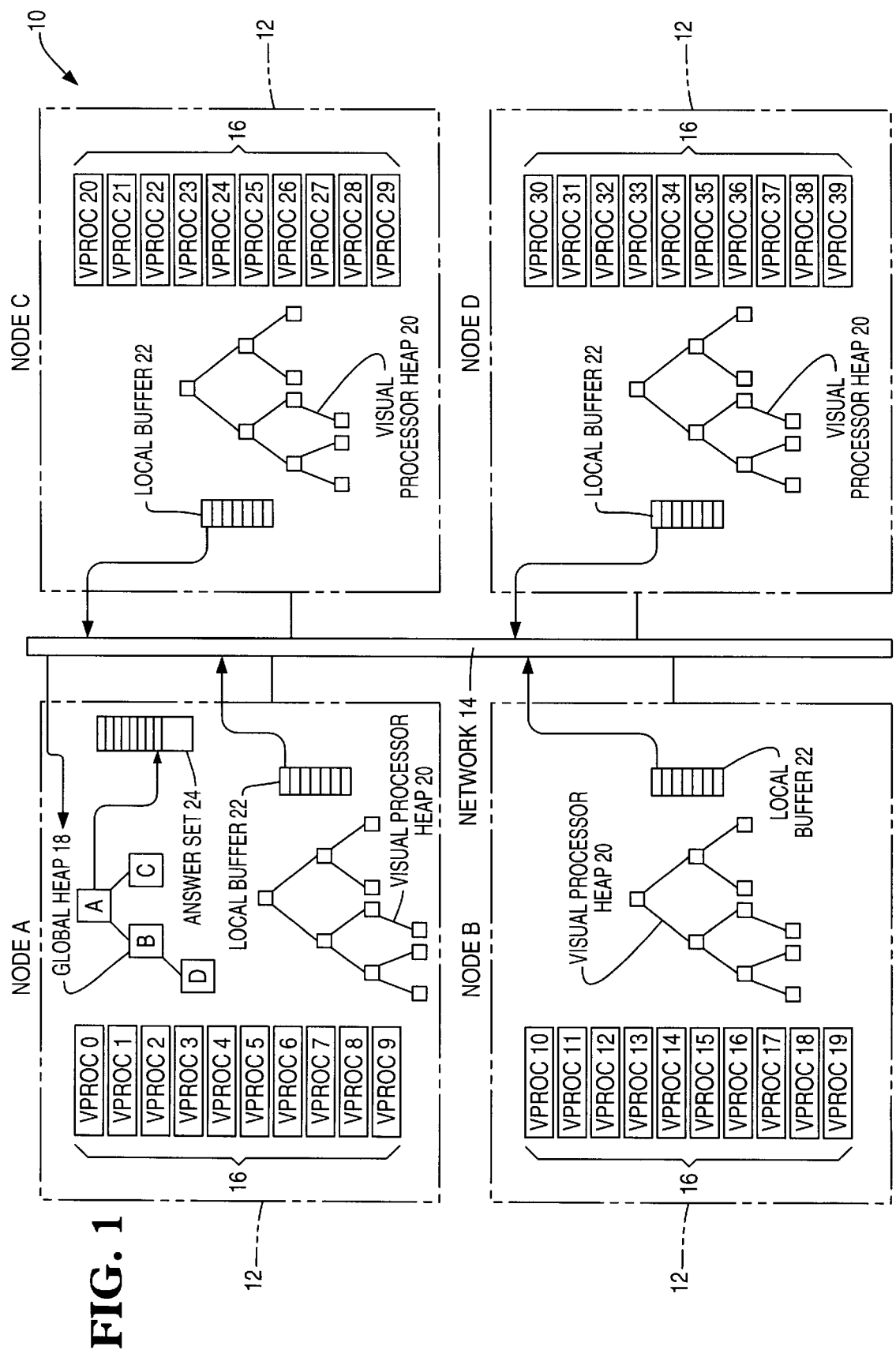
FIG. 1 illustrates an exemplary computer hardware environment that could be used with the present invention.

FIG. 1 illustrates an exemplary computer hardware environment that could be used with the present invention. In the exemplary computer hardware environment, a computer system 10 is comprised of one or more processors or nodes 12 interconnected by a network 14. Each of the nodes 12 is typically a symmetric multi-processor (SMP) architecture and is comprised of a plurality of microprocessors, random access memory (RAM), read-only memory (ROM), and other components. It is envisioned that attached to the nodes 12 may be one or more fixed and/or removable data storage units (DSUs) and data communications units (DCUs), as is well known in the art. Of course, those skilled in the art will recognize that the exemplary environment illustrated in FIG. 1 is not intended to limit the present invention. Indeed, those skilled in the art will recognize that other alternative hardware environments may be used without departing from the scope of the present invention.

Each of the nodes 12 operates under the control of an operating system, such as the UNIX™ operating system. Further, each of the nodes 12 executes one or more computer programs under the control of the operating system. Generally, the operating system and the computer programs are tangibly embodied in and/or retrieved from RAM, ROM, and/or one or more other DSUs or DCUs. Further, both the operating system and the computer programs are loaded into RAM for execution by the node 12. In any embodiment, both the operating system and the computer programs comprise instructions which, when read and executed by the node 12, causes the node 12 to perform the steps necessary to execute the steps or elements of the present invention.

In the preferred embodiment of the present invention, each of the nodes 12 executes one or more virtual processors or "vprocs" 16. The vproc 16 concept is accomplished by executing multiple instances or threads in a node 12, wherein each such thread is encapsulated within a vproc 16. The vproc 16 concept adds a level of abstraction between the multi-threading of a work unit and the physical layout of the MPP computer system 10. Moreover, when the node 12 has an SMP architecture, and thus comprises a plurality of microprocessors, the vproc 16 provides for intra-node 12 as well as the inter-node 12 parallelism.

The vproc 16 concept results in better system availability without undue programming overhead in the application. The vprocs 16 also provide a degree of location transparency, in that vprocs 16 communicate with each other using addresses that are vproc-specific, rather than processor-node-specific. Further, vprocs 16 facilitate redundancy by providing a level of isolation/abstraction between the physical node 12 and the thread of execution, thereby allowing all threads to run even when some nodes 12 have failed or are shut down. The result is increased system utilization and fault tolerance.

There are certain problems, however, which do not easily lend themselves to being divided into parallel processing sub-tasks. One such area is the situation when each vproc 16 generates a file containing its local results, which then must be combined and collated with local results from all other vprocs 16 into a global answer set. Because the combined answer set may be huge, the amount of work and storage required to perform the collection and global collation would be unsuited for a single vproc 16.

Methods which require knowledge of the physical configuration of the system 10 present undesirable levels of software complexity and platform dependencies. An additional complication is that global collation requires global knowledge of each vproc's 16 answer set in order to produce the correct sequence of ordered results. Supporting this global knowledge requires heavy use of the network 14 between the nodes 12 of the system 10.

DESCRIPTION OF A PARALLEL MERGE-SORT FUNCTION

The purpose of the present invention, hereafter referred to as Virtual Processor Buffered Merge Sort, is to address the above problems by presenting an efficient yet simple mechanism for performing a global merge-sort function using distributed result files. The main advantage of the present invention is its ability to scale with respect to the size of the global answer set, yet configuration specific data is neither known nor required. This provides the levels of performance required by applications running heavy workloads on MPP computer systems 10.

Prior solutions for this problem relied on specialized interconnect hardware in order to provide a global view of each local result file. The disadvantage to this approach was the cost and complexity of dedicated hardware and its associated software driver. Additionally, the hardware solution lacked scaleability and thus limited the performance of global merge sorting as parallel platforms grew in size and capacity.

At least one additional software solution directed all the local result files to a single node 12 of the system 10 and collated the sub-files into a global answer set. This solution tended to swamp the designated node 12 with demands for memory and processing resources when large answer sets were being merged.

With this type of approach, each vproc 16 in effect becomes a merge vector. Each vector then must be maintained by the coordinator node 12; as system 10 size increases, so does the set of merge vectors in direct proportion thereof. In order to maintain consistent throughput across the system 10, an artificial limit on the number of concurrent merges had to be imposed, which further limited system performance.

The present invention divides the problem of combining large distributed answer sets into two levels: the upper (system 10 or global) level and the lower (vproc 16) level. At the upper level, there is one designated node 12, labelled as "Node A" in FIG. 1 and known as the coordinator node 12, which maintains a global heap 18 populated with an entry corresponding to each node 12 in the system 10. At the lower level, a local heap 20 is maintained with an entry for each vproc 16 on that node 12. Each entry in the local heap 20 maintains access to the corresponding ordered result file for the associated vproc 16.

The coordinator node 12 establishes an empty global heap 18 on the coordinator node 12. Then, the coordinator node 12 broadcasts a merge message over the network 14 to all nodes 12 in the system 10. This message spawns merge threads on each receiver node 12. These merge threads request local vprocs 18 to fetch their individual (ordered) answer set data. Each vproc 16 responds by presenting its data as an entry in the local heap 20, using well-known heap sort techniques for inserting the entry into the local heap 20. When the local heap 20 is populated on a given node 12, a local buffer 22 of sorted records is generated. The local buffer 22 generated from each local heap 20 is sent over the network 14 to the coordinator node 12, where it becomes an entry in the global heap 18, using well-known heap sort techniques for inserting the entry into the global heap 18. When the global heap 18 is fully populated, the buffered merge is ready to begin, using well-known merge-sort techniques. The coordinator node 12 directs the merge by sending the requests for data to the node 12 whose entry sorts lowest in the global heap 18. The node 12 receiving this request gathers enough data from its local heap 20 to satisfy the request, and then forwards the buffer to the coordinator node 12 to update the global heap 18. When this data arrives from the specific node 12, the coordinator node 12 inserts it into the global heap 18 and performs the necessary actions to maintain order in the global heap 18.

Once the global heap 18 is fully populated, the coordinator node 12 retrieves the ordered data from the global heap 18 and builds an answer set buffer 24 therefrom. This buffer 24 is the ordered answer set generated by the merge-sort function, which will eventually be presented to the client requesting the data.

As an individual vproc 16 exhausts its data, its corresponding entry is pruned from the local heap 20 on the local node 12. As individual nodes 12 exhaust their data, the coordinator node 12 prunes the corresponding entries from the global heap 18. When the global heap 18 is exhausted, the merge is complete.

Because vprocs 16 are deployed for balance and efficiency based on available hardware, the lower level tends to inherit appropriately scaled workloads when building its locally-merged buffer 22. Parallelism is exploited because each node 12 is able to build its local buffer 22 independent of the coordinator node 12. After the coordinator node 12 has requested and received data from a participating node 12, the lower level is free to begin building subsequent local buffers 22. Subsequent requests for buffers 22 from the coordinator node 12 are then immediately satisfied.

By relying on the coordinator node 12 at the upper level, the logic for upper level is simple and efficient. For example, the upper level needs to consider data only from each node 12 and not from each vproc 16. Logic for performing the merge-sort functions and maintaining the heaps 18 and 20 for both upper and lower level processes is similar and can therefore utilize the same or similar functional modules.

EXECUTION OF A PARALLEL MERGE-SORT FUNCTION

Figure 2A:
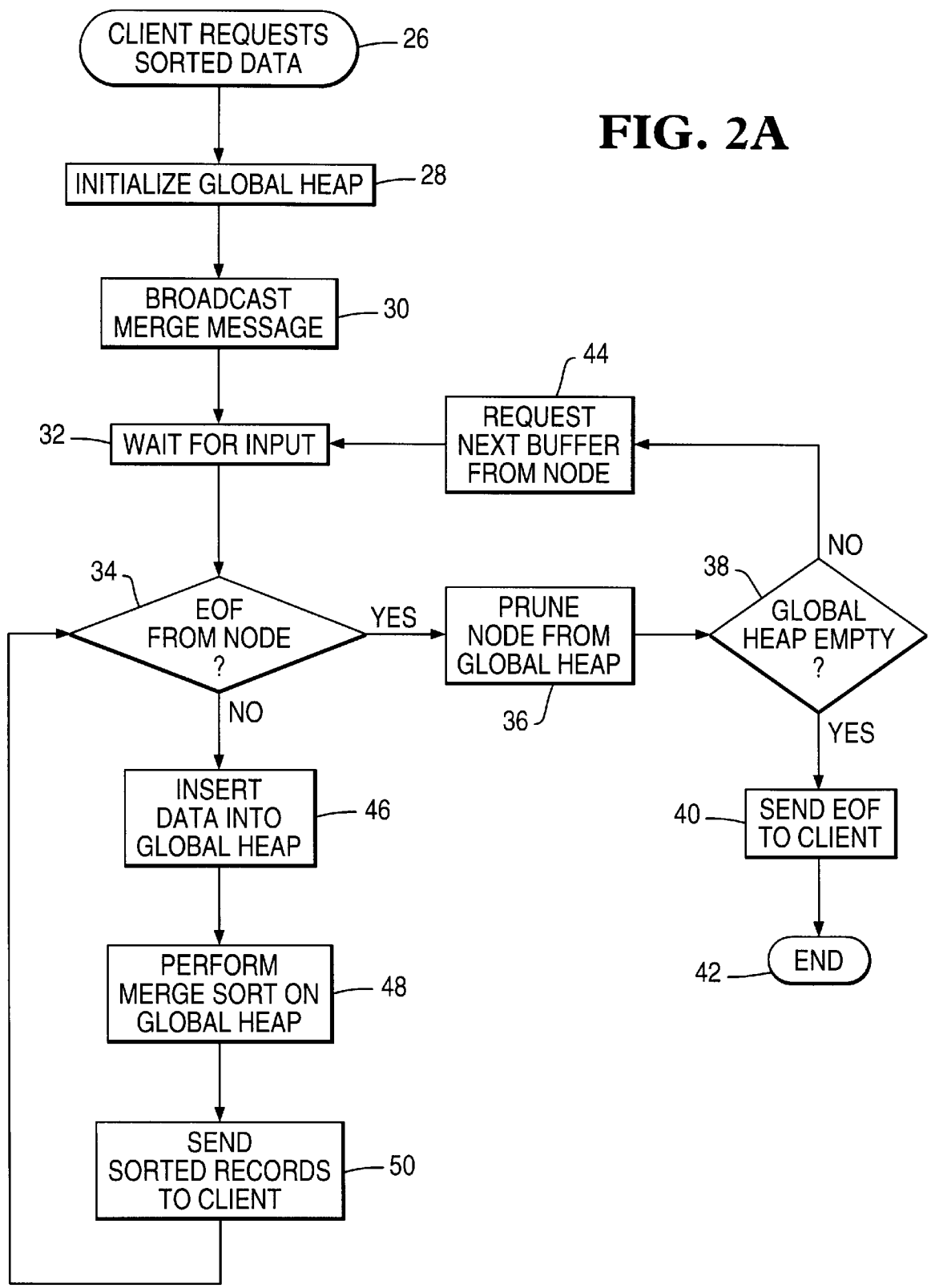
Figure 2B:
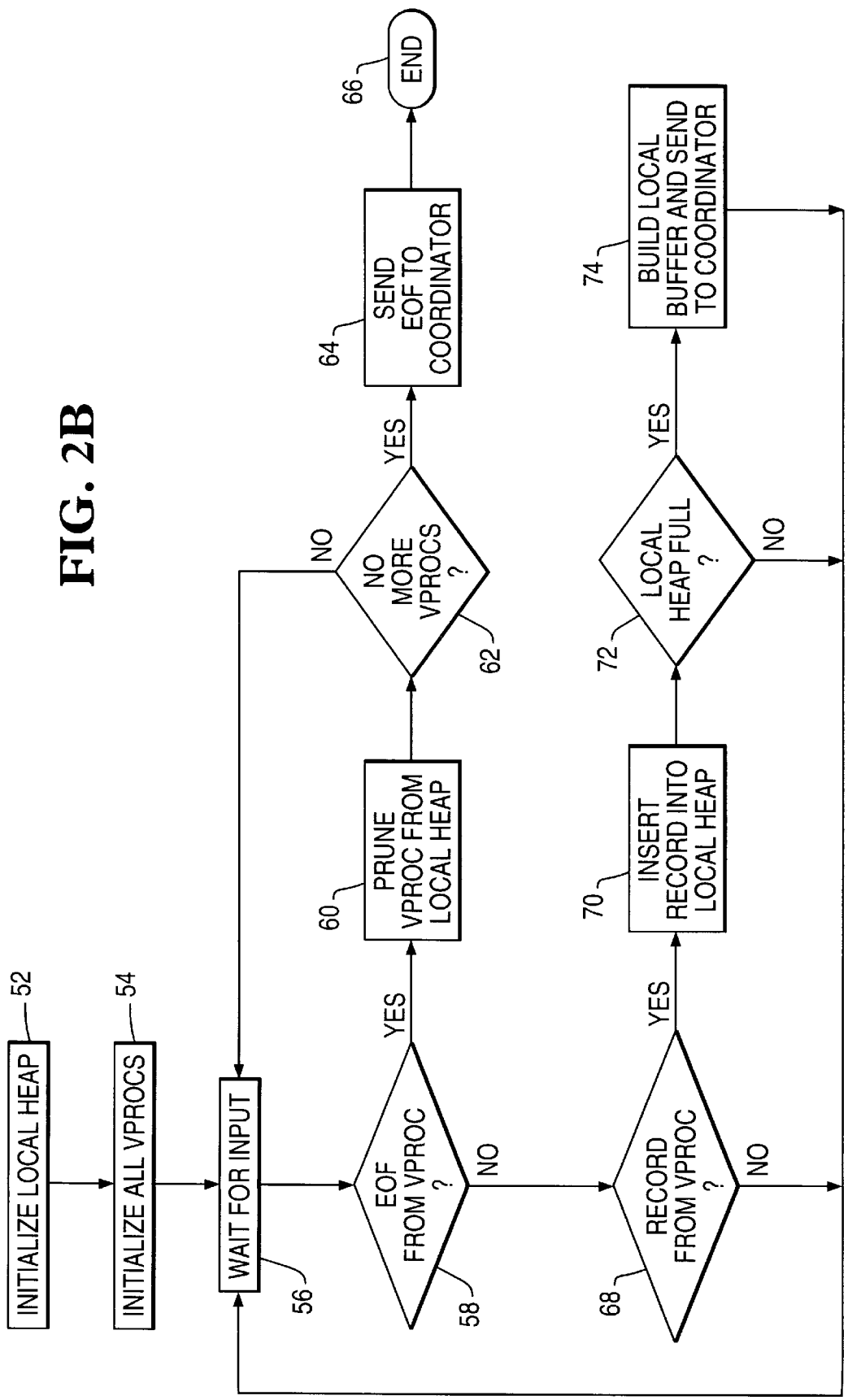

FIGS. 2A and 2B are flowcharts illustrating the logic of the present invention. More specifically, FIG. 2A illustrates the steps of the coordinator node 12 and FIG. 2B illustrates the steps of all nodes 12 executing vprocs 16 according to the method described above.

Referring to FIG. 2A with regard to upper level processing, a global data structure 18 is generated on the coordinator node 12, wherein the global data structure 18 stores ordered entries associated with the records generated by each of the nodes 12. More specifically, Block 26 represents the coordinator node 12 receiving a client request for sorted data, Block 28 represents the coordinator node 12 initializing a global heap 18, and Block 30 represents the coordinator node 12 broadcasting a merge message to all nodes 12 in the system 10, wherein the merge message spawns one or more merge threads or vprocs 16 on each of the nodes 12 and each of the merge threads or vprocs 16 generate individual ordered answer sets of records. Block 32 represents the coordinator node 12 waiting to receive input from the nodes 12. Block 34 is a decision block that represents the coordinator node 12 determining whether an end-of-file (EOF) was received from a node 12. If so, control transfers to Block 36, which represents the coordinator node 12 pruning the node 12 from the global heap 18. Block 38 is a decision block that represents the coordinator node 12 determining whether the global heap 18 is empty. If so, then Block 40 represents an end-of-file (EOF) being sent to the client and Block 42 represents the termination of the method. Otherwise, control transfers to Block 44, which represents the coordinator node 12 requesting the next local buffer 22 from the node 12. Block 46 represents the coordinator node 12 inserting the local buffer 22 into the global heap 18. Block 48 represents the coordinator node 12 performing a merge sort on the global heap 18. Block 50 represents the coordinator node 12 sending the sorted records to the client. Thereafter, control transfers to Block 34.

Referring to FIG. 2B with regard to lower level processing, a local data structure 20 is generated on each of the nodes 12, wherein the local data structure 20 stores ordered entries associated with the records generated by each of the threads or vprocs 16. More specifically, Block 52 represents the node 12 initializing a local heap 20 and Block 54 represents the node 12 initializing or spawning one or more merge threads or vprocs 16 in response to the broadcast merge message from the coordinator node 12, wherein each of the merge threads or vprocs 16 generate individual ordered answer sets of records. Block 56 represents the node 12 waiting to receive input from the vprocs 16. Block 58 is a decision block that represents the node 12 determining whether an end-of-file (EOF) was received from a vproc 16. If so, control transfers to Block 60, which represents the node 12 pruning the vproc 16 from the local heap 20. Block 62 is a decision block that represents the node 12 determining whether there are no more vprocs 16 in the local heap 20. If so, then Block 64 represents the node 12 sending an EOF message to the coordinator node 12 and Block 66 represents the termination of the method; otherwise, control transfers back to Block 56. Block 68 is a decision block the represents the node 12 determining whether a record was received from a vproc 16. If so, control transfers to Block 70, which represents the node 12 inserting the record into the local heap 18. Block 72 is a decision block that represents the node 12 determining whether the local heap 20 is full; if so, control transfers to Block 74, which builds the local buffer 22 and sends the local buffer 22 to the coordinator node 12. Thereafter, control transfers to Block 56.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, other sort functions that can be parallelized could benefit from the present invention.

In summary, the present invention discloses a method, apparatus, and article of manufacture for sorting data on a parallel processing computer system, wherein the system is comprised of one or more nodes, each of the nodes executes one or more threads to generate a subset of the data, and the subset of data comprises one or more records. A local data structure is generated on each of the nodes, wherein the local data structure stores ordered entries associated with the records generated by each of the threads. A global data structure is generated on a coordinator node, wherein the global data structure stores ordered entries associated with the records stored in each of the local data structures generated by each of the nodes. An answer set is generated using sorted records from the global data structure.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for sorting data on a parallel processing computer system, wherein the system is comprised of one or more nodes, each of the nodes executes one or more threads to generate a subset of the data, and the subset of data comprises one or more records, the method comprising the steps of:

(a) generating a local data structure on each of the nodes, wherein the local data structure stores ordered entries associated with the records generated by each of the threads;

(b) generating a global data structure on a coordinator node, wherein the global data structure stores ordered entries associated with the records stored in each of the local data structures generated by each of the nodes;

(c) generating an answer set comprising sorted records from the global data structures;

(d) as each thread exhausts its records, pruning its corresponding entry from the local data structure;

(e) as each node exhausts its records, pruning its corresponding entry from the global data structure; and (f) when the global data structure exhausts its records, terminating the method.

2. The method of claim 1 above, wherein the generating step (a) comprises the steps of:

(1) broadcasting a merge message from a coordinator node to all nodes in the system, wherein the merge message spawns one or more merge threads on each of the nodes and each of the merge threads generate individual ordered answer sets of records;

(2) inserting records from each of the answer sets as entries into the local data structure on the node until the local data structure is populated and then generating a local buffer of sorted records from the local data structure;

(3) transmitting the local buffer to the coordinator node; and (4) generating another subsequent local buffer and setting it aside so as to immediately satisfy a next request from the coordinator node.

3. The method of claim 2 above, wherein the generating step (b) comprises the steps of:

(1) receiving the local buffers at the coordinator node; and (2) inserting the records from each of the local buffers as entries into a global data structure on the coordinator node until the global data structure is populated and then generating an answer set of sorted records from the global data structure.

4. The method of claim 3, further comprising the steps of:

(3) sending a request for additional records from the coordinator node to a node whose entry sorts lowest in the global data structure;

(4) inserting records from the answer set of the node receiving the request as entries into its local data structure until the local data structure is populated and then generating the local buffer of sorted records from the local data structure;

(5) transmitting the local buffer to the coordinator node in response to the request; and (6) inserting the records from the local buffers as entries into the global data structure on the coordinator node until the global data structure is populated and then generating an answer set of sorted records from the global data structure.

5. The method of claim 1, wherein the local data structure comprises a heap.

6. The method of claim 1, wherein the global data structure comprises a heap.

7. An apparatus for sorting data, comprising:

(a) a parallel processing computer system comprised of one or more nodes, wherein each node executes one or more threads to generating a subset of the data comprised of one or more records;

(b) means, performed by the computer system, for generating a local data structure on each of the nodes, wherein the local data structure stores ordered entries associated with the records generated by each of the threads;

(c) means, performed by the computer system, for generating a global data structure on a coordinator node, wherein the global data structure stores ordered entries associated with the records stored in each of the local data structures generated by each of the nodes;

(d) means, performed by the computer system, for generating an answer set comprising sorted records from the global data structure;

(e) means, performed by the computer system for pruning a corresponding entry from the local data structure as each thread exhausts its records;

(f) means, performed by the computer system, for pruning a corresponding entry from the global data structure as each node exhausts its records; and (g) means, performed by the computer system, for terminating the processing when the global data structure exhausts its records.

8. The method of claim 7 above, wherein the generating step (a) comprises the steps of:

(1) broadcasting a merge message from a coordinator node to all nodes in the system, wherein the merge message spawns one or more merge threads on each of the nodes and each of the merge threads generate individual ordered answer sets of records;

(2) inserting records from each of the answer sets as entries into the local data structure on the node until the local data structure is populated and then generating a local buffer of sorted records from the local data structure;

(3) transmitting the local buffer to the coordinator node; and (4) generating another subsequent local buffer and setting it aside so as to immediately satisfy a next request from the coordinator node.

9. The method of claim 8 above, wherein the generating step (b) comprises the steps of:

(1) receiving the local buffers at the coordinator node; and (2) inserting the records from each of the local buffers as entries into a global data structure on the coordinator node until the global data structure is populated and then generating an answer set of sorted records from the global data structure.

10. The method of claim 9, further comprising the steps of:

(3) sending a request for additional records from the coordinator node to a node whose entry sorts lowest in the global data structure;

(4) inserting records from the answer set of the node receiving the request as entries into its local data structure until the local data structure is populated and then generating the local buffer of sorted records from the local data structure;

(5) transmitting the local buffer to the coordinator node in response to the request; and (6) inserting the records from the local buffers as entries into the global data structure on the coordinator node until the global data structure is populated and then generating an answer set of sorted records from the global data structure.

11. The method of claim 7, wherein the local data structure comprises a heap.

12. The method of claim 7, wherein the global data structure comprises a heap.

13. An article of manufacture comprising computer program carrier, readable by a computer system and embodying one or more programs of instructions executable by the computer systems to perform method steps for sorting data on a parallel processing computer system comprised of one or more nodes, wherein each node executes one or more threads to generate a subset of the data comprised of one or more records, the method comprising the steps of:

(a) generating a local data structure on each of the nodes, wherein the local data structure stores ordered entries associated with the records generated by each of the threads;

(b) generating a global data structure on a coordinator node, wherein the global data structure stores ordered entries associated with the records stored in each of the local data structures generated by each of the nodes;

(c) generating an answer set comprising sorted records from the global data structure;

(d) as each thread exhausts its records, pruning its corresponding entry from the local data structure;

(e) as each node exhausts its records, pruning its corresponding entry from the global data structure; and (f) when the global data structure exhausts its records, terminating the method.

14. The method of claim 13 above, wherein the generating step (a) comprises the steps of:

(1) broadcasting a merge message from a coordinator node to all nodes in the system, wherein the merge message spawns one or more merge threads on each of the nodes and each of the merge threads generate individual ordered answer sets of records;

(2) inserting records from each of the answer sets as entries into the local data structure on the node until the local data structure is populated and then generating a local buffer of sorted records from the local data structure;

(3) transmitting the local buffer to the coordinator node; and (4) generating another subsequent local buffer and setting it aside so as to immediately satisfy a next request from the coordinator node.

15. The method of claim 14 above, wherein the generating step (b) comprises the steps of:

(1) receiving the local buffers at the coordinator node; and (2) inserting the records from each of the local buffers as entries into a global data structure on the coordinator node until the global data structure is populated and then generating an answer set of sorted records from the global data structure.

16. The method of claim 15, further comprising the steps of:

(3) sending a request for additional records from the coordinator node to a node whose entry sorts lowest in the global data structure;

(4) inserting records from the answer set of the node receiving the request as entries into its local data structure until the local data structure is populated and then generating the local buffer of sorted records from the local data structure;

(5) transmitting the local buffer to the coordinator node in response to the request; and (6) inserting the records from the local buffers as entries into the global data structure on the coordinator node until the global data structure is populated and then generating an answer set of sorted records from the global data structure.

17. The method of claim 13, wherein the local data structure comprises a heap.

18. The method of claim 13, wherein the global data structure comprises a heap.

* * * * *